United States Patent
Hansen

(12) 
(10) Patent No.: US 10,609,897 B2
(45) Date of Patent: Apr. 7, 2020

(54) PIVOTABLE FEED MIXER

(71) Applicants: GEA Farm Technologies GmbH, Bönen (DE); GEA Farm Technologies Mullerup A/S, Ullerslev (DK)

(72) Inventor: Henrik Lund Hansen, Ørbæk (DK)

(73) Assignee: GEA Farm Technologies GmbH, Bönen (DE)

(*) Notice: Subject to any disclaimer, the term of this patent is extended or adjusted under 35 U.S.C. 154(b) by 305 days.

(21) Appl. No.: 15/122,878

(22) PCT Filed: Mar. 4, 2015

(86) PCT No.: PCT/EP2015/054515
§ 371 (c)(1),
(2) Date: Aug. 31, 2016

(87) PCT Pub. No.: WO2015/139960
PCT Pub. Date: Sep. 24, 2015

(65) Prior Publication Data
US 2017/0094937 A1 Apr. 6, 2017

(30) Foreign Application Priority Data
Mar. 20, 2014 (DE) .................. 10 2014 103 857

(51) Int. Cl.
| | |
|---|---|
| *A01K 5/00* | (2006.01) |
| *B01F 15/02* | (2006.01) |
| *B01F 7/24* | (2006.01) |
| *A01K 5/02* | (2006.01) |
| *B01F 7/08* | (2006.01) |

(Continued)

(52) U.S. Cl.
CPC ............ *A01K 5/004* (2013.01); *A01K 5/0208* (2013.01); *B01F 7/00933* (2013.01); *B01F 7/08* (2013.01);
(Continued)

(58) Field of Classification Search
CPC . A01K 5/004; A01K 5/0208; B01F 15/00194; B01F 15/00831;
(Continued)

(56) References Cited

U.S. PATENT DOCUMENTS

| | | |
|---|---|---|
| 7,118,268 B2 | 10/2006 | Van Der Plas |
| 8,408,485 B2 | 4/2013 | Milam et al. |

(Continued)

FOREIGN PATENT DOCUMENTS

| | | |
|---|---|---|
| DE | 202011105225 | 2/2013 |
| WO | 2007/037693 A2 | 4/2007 |

(Continued)

OTHER PUBLICATIONS

International Search Report and Written Opinion dated Jun. 15, 2015 for PCT Application No. PCT/EP2015/054515, 3 pages.

(Continued)

*Primary Examiner* — Charles Cooley
(74) *Attorney, Agent, or Firm* — Smith Law Office; Jeffry W. Smith

(57) ABSTRACT

In order to provide a feed mixture, a feed mixer is proposed which has a container. The container has a bottom and a wall which is connected to the bottom and delimits a filling opening, the area of which is greater than the area of the bottom. A rotatable auger is provided which can be rotated about an axis, the axis running substantially perpendicularly with respect to the bottom. The feed mixer has a pivoting device which is intended and suitable for pivoting the container during a mixing operation, in particular after a predefined time period or after a predefined number of revolutions of the at least one auger.

17 Claims, 3 Drawing Sheets

(51) Int. Cl.
*B01F 15/00* (2006.01)
*B01F 7/00* (2006.01)

(52) U.S. Cl.
CPC .............. *B01F 7/241* (2013.01); *B01F 7/245* (2013.01); *B01F 15/00129* (2013.01); *B01F 15/00194* (2013.01); *B01F 15/00201* (2013.01); *B01F 15/00331* (2013.01); *B01F 15/00831* (2013.01); *B01F 15/0295* (2013.01); *B01F 2215/0008* (2013.01)

(58) Field of Classification Search
CPC .......... B01F 15/00201; B01F 15/00331; B01F 7/00933; B01F 7/08; B01F 15/00129; B01F 2215/0008; B01F 15/0295; B01F 7/24; B01F 7/242; B01F 7/245
USPC ....... 366/302, 306, 307, 314, 607, 318–324; 241/101.76, 101.761, 101.8, 260.1, 605
See application file for complete search history.

(56) References Cited

U.S. PATENT DOCUMENTS

| 2013/0058189 | A1 | 3/2013 | Liet | |
| 2016/0339405 | A1* | 11/2016 | Bump | .................. B01F 13/004 |
| 2017/0094937 | A1* | 4/2017 | Hansen | .................. A01K 5/004 |
| 2018/0255823 | A1* | 9/2018 | Rowntree | ............ A23N 17/007 |

FOREIGN PATENT DOCUMENTS

| WO | 2011/101801 A1 | 8/2011 | |
| WO | WO-2015030574 A1 * | 3/2015 | ............ A01K 5/001 |

OTHER PUBLICATIONS

International Preliminary Report on Patentability dated Sep. 29, 2016 for PCT Application No. PCT/EP2015/054515, 6 pages.

* cited by examiner

PIVOTABLE FEED MIXER

CROSS REFERENCE TO RELATED APPLICATIONS

This application is a national phase application under 35 U.S.C. § 371 of PCT International Application No. PCT/EP2015/054515, filed Mar. 4, 2015, which claims priority to German Application No. 10 2014 103 857.6 filed Mar. 20, 2014, the disclosures of which are incorporated by reference herein.

FIELD AND BACKGROUND OF THE INVENTION

The subject matter of the invention relates to a feed mixer and to a method for mixing feed in a feed mixer.

In particular in the field of an agricultural dairy farm, the feed supply of cows plays a significant role. Feed with a suitable consistency and/or composition for animals is provided by means of a feed mixer.

To this end, feed is introduced into a container through a filling opening. The feed can contain different components such as grass, straw and corn silages, minerals and concentrated feed. The container has at least one auger (or worm) for conveying and thereby mixing the feed components which rotates about an axis which rotates substantially perpendicularly with respect to the bottom of the container. A mixing container can optionally also be provided with a water connection, in order to achieve moistening of the feed. The auger can be provided with knives, by means of which the feed which is situated in the container is comminuted and mixed. Subsequently, the feed is discharged from the container via a feed discharge unit.

It is known that a feed mixer can also be provided with a weighing device, in order to make a determination of the feed weight possible during loading and/or processing. The feed mixer can also have a plurality of augers. It is known that feed mixers of this type can be arranged on a mobile chassis, with the result that the feed mixer can be moved to the feed store, in order to be loaded, and, after the mixing and/or comminution operation has taken place, is moved, for example, along a feeding table, the feed being discharged from the container. A mobile feed mixer of this type is known, for example, from Mix and Drive das breite Futtermischwagenprogramm für jeden Einsatz [Mix and Drive, the extensive feed mixing wagon programme for all uses], GEA Farm Technologies, 9997-1819-000/PSC 5030999999/9502020199/L&L: d&d/D: STU/06-2012.

In the container, it is known that two walls of the container which lie opposite one another are of conically widened configuration at the top in order to increase the volume of the container. Here, the area of the bottom is smaller than the area of the filling opening. A feed mixer of this type is known, for example, from document DE 20 2011 105 225 U1.

It is problematic in a feed mixer of this type that complete mixing of the feed cannot be achieved to a satisfactory extent in the region of the conical widening. In order to solve this problem, it has already been proposed in WO 2007/037693 A2 that the auger is connected to a drive unit by means of a ball joint. In order to deflect the auger in the direction of the conical widening, a linkage is provided which can be adjusted by means of a cylinder/piston unit.

SUMMARY OF THE INVENTION

Proceeding from this, the present invention is based on the aim of specifying a method, by means of which an improved feed mixture can be provided.

According to the invention, this object is achieved by way of a method for providing a feed mixture having the features described below. Advantageous developments and refinements of the method according to the invention are also described below.

The features which are described individually can be combined with one another in any desired way which is technologically appropriate and can define further refinements of the invention. Moreover, the features which are specified will be defined and explained in greater detail in the description, further preferred exemplary embodiments of the invention being shown.

In order to provide a feed mixture, a method is proposed, in which at least one feed component is introduced into a container of a mixer. The container has a bottom and a wall which is connected to the bottom and delimits an introduction opening, the area of which is greater than the area of the bottom. At least one auger is activated which can be rotated about an axis which runs substantially perpendicularly with respect to the bottom. In a preferred embodiment, at least one of at least two augers, in particular at least one of the outermost augers can be rotated about an axis which is tilted in an oblique angle with respect to the bottom. Alternatively, or in combination the bottom comprises two or more sectors which are tilted to the neighbouring sector of the bottom. A mixing operation is carried out by means of the at least one auger. The mixing operation can also comprise comminution of the feed component which is introduced into the container. To this end, the auger is provided with corresponding cutting devices, e. g. knives. The container is pivoted during the mixing operation.

The pivoting operation takes place, in particular, after a predefined time period or following other identification criteria, e. g. after a predefined number of revolutions of the at least one auger. As a result of the pivoting operation of the container, the at least one feed component is displaced from a region which is remote from the at least one auger in the direction of the mixing region which is defined by the auger. This results in improved thorough mixing of the at least one feed component. The pivoting of the container preferably takes place in a rocker-like manner, with the result that the opposite regions, in which possibly less thorough mixing takes place, also and the displacement of the container the feed can pass in the direction of the auger.

The pivoting of the container can be triggered manually. However, a refinement is preferred, in which the pivoting operation takes place in an automated manner. During the automatic execution of the pivoting operation, the pivoting operation can take place under consideration of different parameters which are taken into consideration individually or jointly or in a weighted manner. It is proposed, in particular, that the pivoting operation takes place as a function of a time period or a predefined number of revolutions of the auger. It is advantageously taken into consideration here which properties the at least one component of the feed has. If a plurality of feed components are introduced into the container one after another, it is proposed that the predefined time period or the predefined number of revolutions of the at least one auger is determined as a function of the sequence of the introduction.

It is proposed, in particular, that the predefined time period or the predefined number of revolutions of the at least one auger is determined as a function of the overall weight and/or individual weight of the feed components.

The thorough mixing of the feed and/or the degree of comminution of the feed are/is also dependent on an angle of the auger which tapers conically towards the filling opening. It is therefore proposed that the predefined time period or the predefined number of revolutions is determined as a function of this angle of the conically tapering auger.

It is proposed according to a further advantageous refinement of the method according to the invention that the predefined time period or the predefined number of revolutions is determined as a function of a ratio of the height of the container to the axial extent of the at least one auger.

It has proven advantageous that the predefined time period or the predefined number of revolutions is determined as a function of a belt angle of at least one belt section which widens substantially conically from the bottom. As a result, further improved thorough mixing and/or optionally comminution of the feed component or the feed components are/is achieved.

During a mixing operation, the container is preferably pivoted multiple times. It is moved from a starting position into a pivoting position. From this pivoting position, the container can be moved into the starting position or into another pivoting position. Here, the container is preferably pivoted about a substantially horizontally running axis; this pivoting operation can thus be considered to be a rocker-like movement of the container. This rocker-like movement can be combined with similar rocker-like movements by other axes. The dwell time in the respective pivoting position can be identical or different. The time intervals between the pivoting operations can vary as a function of the mixing result or the overall mixing duration and optionally the sequence of the introduced components.

Pivoting of the container about a substantially horizontal axis is one preferred refinement of the invention. A method is preferred, however, in which the container is pivoted in such a way that the axis of the auger intersects the axis of gravity at a pivoting angle.

It is proposed according to a further advantageous refinement of the method that the pivoting angle is determined as a function of at least one property of the at least one feed component, in particular as a function of the volume and/or weight of at least one feed component. If at least two feed components are introduced into the container one after another or simultaneously, it is proposed that the pivoting angle is determined as a function of the sequence of the introduction. Here, the properties of the individual feed components are taken into consideration during the determination of the pivoting angle. Improved thorough mixing and/or comminution of the feed components are/is achieved as a result.

It is proposed according to a further advantageous refinement of the method that the pivoting angle is determined as a function of the overall weight and/or individual weight and/or the overall volume and/or individual volume of the feed component/components. It is advantageous, in particular, if the pivoting angle is also determined as a function only of an angle of the auger which tapers conically towards the filling opening.

It is proposed according to a further preferred embodiment of the method that the pivoting angle is determined by a ratio of the height of the container to the axial extent of the at least one auger.

In order to increase the volume of the container, the container is configured in such a way that at least one wall section widens in a substantially conical manner from the bottom of the container. The angle of the conical widening of the wall section is called wall angle. It is therefore proposed, in particular, that the pivoting angle is determined as a function of a wall angle. This has the advantage that the pivoting angle can also be smaller in the case of relatively small wall angles than in the case of relatively large wall angles.

In order to unload the finished feed mixture, the container can be pivoted by an unloading angle, in order to simplify the unloading operation. In order to unload the feed mixture, the container is pivoted. The pivoting direction for unloading the feed mixture preferably corresponds to a pivoting direction during the mixing operation, the unloading angle being greater than the pivoting angle, preferably being a multiple of the pivoting angle.

The pivoting angle is determined based on several factors, preferably depending on at least one of the following factors: the weight and/or volume of the feed components to be mixed, the consistency of the feed components, the dimensions of the container and/or the at least one auger.

The method according to the invention is suitable, in particular, for providing a feed mixture between 0.05 m$^3$ and 100 m$^3$ and/or between 25 kg and 25000 kg, preferably between 0.05 m$^3$ and 3.4 m$^3$ and/or between 25 kg and 1700 kg.

The method according to the invention is also suitable for providing a feed mixture, the container having two or more augers. During the mixing operation, additional feed components can be introduced. They can be, in particular, concentrated feed components here. Liquid, in particular water, can optionally be added to the feed mixture.

Furthermore, the present invention is based on the aim of providing a feed mixture which is of structurally simple configuration.

According to the invention, this object is achieved by way of a feed mixer having the features described herein. Advantageous developments and refinements of the feed mixer according to the invention are possible.

According to a further inventive concept, a feed mixer for providing a feed mixture is proposed. The feed mixer has a container. The container has a bottom and a wall which is connected to the bottom. The wall delimits a filling opening, the area of which is greater than the area of the bottom. At least one auger is provided inside the container, which auger can be rotated about an axis which runs substantially perpendicularly with respect to the bottom. The feed mixer can be a stationary or mobile feed mixer. In the case of a mobile configuration of the feed mixer, the drive of the auger can take place via a power take-off drive (PTO) and/or by hydraulic and/or electric power for stationary operation. The auger preferably has knives which comminute and mix the at least one feed component. Opposing knives can optionally be arranged in the wall of the container, which opposing knives bring about an improvement in the homogenization of the feed mixture. Depending on the starting consistency of the feed component, the position of the opposing knives can be set from the outside manually or preferably in an automatized way, e. g. hydraulically in an infinitely variable manner.

The feed mixer according to the invention has a pivoting device which is intended and suitable for pivoting the container during a mixing operation, in particular after a predefined time period or after a predefined number of revolutions of the at least one auger. As a result of the pivoting operation, feed from regions of less thorough mixing passes into the regions of more thorough mixing. In particular, as a result of the pivoting operation, feed is moved into the area of action of the at least one auger. The force of gravity is utilized here.

The feed mixer according to the invention preferably has a weighing device. The weighing device can be realized, for example, by means of pressure sensors or load cells. The mixing operation can be carried out as a function of the weight of the individual feed components or the overall weight of the feed components as well as the volume of the individual feed components as and/or the overall volume of the feed components.

In order to avoid feed falling out of the container as a result of the pivoting operation, an inwardly directed collar can be provided which delimits the filling opening.

It is proposed according to one advantageous refinement of the feed mixer according to the invention that the container has a height and the at least one auger has an axial extent, the ratio of the height of the container to the axial extent being greater than 1.1, preferably lying between 1.2 and 1.8.

It is proposed according to a further advantageous refinement of the feed mixer according to the invention that the container is pivoted in such a way that the axis of the auger intersects the axis of gravity at a pivoting angle.

If the container of the feed mixer is configured in such a way that the container has at least one wall section which widens substantially conically from the bottom, with a wall angle, it is proposed that the ratio between the wall angle and the pivoting angle is greater than 3, in particular lies between 3.5 and 7.

In a preferred embodiment the auger has at the bottom a dimension which is essentially identical to the dimension of the bottom. This allows an efficient mixing while avoiding zones in which no mixing takes place.

In order to simplify the structural complexity of the feed mixer according to the invention and in order to provide the possibility to also configure the feed mixer as a mobile feed mixer, it is proposed that the container is pivoted about a substantially horizontally running pivot axis.

The pivoting operation takes place by means of the pivoting device. The pivoting device preferably has at least one cylinder/piston unit. The cylinder/piston unit can be operated mechanically, hydraulically or pneumatically.

It is proposed, in particular, that the container has pins which lie opposite one another, protrude from the wall and engage into corresponding receptacles of support structures which are arranged on both sides of the container. The pins form a pivot axis, about which the container can be pivoted. The support structure can also be configured in such a way that containers of different size are received by the support structure. Here, the feed mixer has a weighing device; for instance, pressure sensors or load cells which are suitable for determining the weight of the feed can be provided in the region of the pins.

The feed mixer preferably has at least one conveying means, by means of which a feed mixture is discharged from the container. The conveying means can be configured, for example, in the form of a conveyor belt which extends from the bottom along the wall section towards the filling opening. In order to discharge the feed mixer, the feed mixer is pivoted in such a way that the feed mixture can fall in the direction of the conveying means.

In order to automate the operations in the feed mixer and in order to control and regulate the mixing operation, the feed mixer has a controller which is connected in terms of signal technology at least to the pivoting device. The controller can also be connected to the weighing device. Furthermore, the controller can have an input terminal, by means of which optionally coded information about the individual feed components can be input. The controller can also have a memory, in which different feed components are stored with their properties. The corresponding feed component is called up by means of the input terminal and optionally the sequence is fixed, with which the feed components are introduced into the feed mixer. The controller can have a microcontroller or data processing unit, by means of which the duration of the mixing operation and the number and/or the frequency of the pivoting operations during the mixing operation are determined on the basis of the information about the properties of the components of the feed medium.

Further advantages and details of the feed mixer according to the invention and of the method according to the invention will be explained using one preferred exemplary embodiment, without the subject matter of the invention being restricted to this specific exemplary embodiment. In the drawing:

DETAILED DESCRIPTION OF THE DRAWINGS

Figure 1:
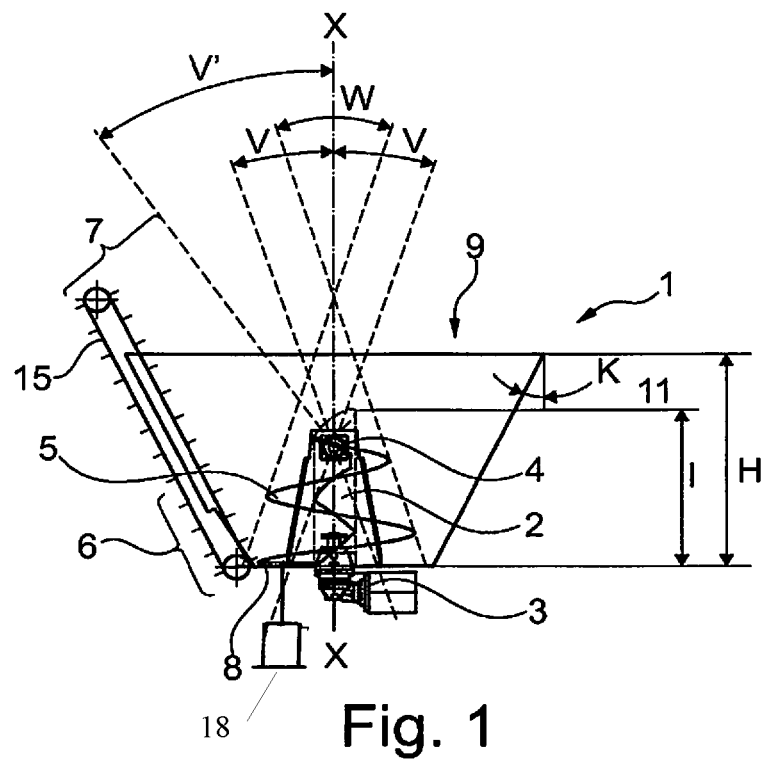
FIG. 1 diagrammatically shows a side view of a feed mixer according to the invention.

FIG. 1 shows one preferred refinement of the feed mixer according to the invention for providing a feed mixture. The feed mixer has a container 1. The container 1 has a bottom 8. In the exemplary embodiment which is shown, the bottom is circular, as can be seen from FIG. 2. This is not absolutely necessary. A wall 10 which delimits a filling opening 9 extends from the bottom 8 and is connected to the latter.

In the exemplary embodiment which is shown, the wall 10 is configured in such a way that the filling opening 9 has a substantially oval shape. The wall 10 has two wall sections 11, 12 which widen substantially conically from the bottom 8. The wall sections 12 of conical configuration have a wall angle K which is shown in FIG. 1. The conical wall sections 11, 12 are arranged so as to lie opposite one another. Wall sections 13, 14 which are configured substantially parallel to one another are provided with the conical wall sections 11, 12. The wall sections 13, 14 do not lie perpendicularly on the bottom 8.

The wall angle K is preferably smaller than 45°, in particular smaller than or equal to 26°. In particular, the wall angle K lies at 15°.

An auger 2 is arranged inside the container 1. The auger 2 has at least one cutting device, here a knife 5 which extends helically in the axial direction. It can be seen from the illustration according to FIG. 1 that the auger 2 tapers conically towards the filling opening 9 at an angle W. The auger 2 can be rotated about an axis X. The axis X lies substantially perpendicularly on the bottom 8. The reference numeral 3 denotes a drive unit which serves to drive the auger 2. The drive unit 3 can be, for example, an electric motor. If the feed mixer is configured as a mobile feed mixer, the drive 3 can be configured in the form of a power take-off drive (PTO) which is connected to the traction vehicle.

A conveying means 6 is provided in the exemplary embodiment which is shown in order to unload a feed mixture. The conveying means 6 comprises a conveyor belt 15 which, in the exemplary embodiment which is shown, is provided in the region of the conically configured wall section 12. The conveyor belt 15 extends from the bottom 8 in the direction of the filling opening 9 and beyond the latter. A passage opening is provided in the wall section 12, through which passage opening the conveyor belt 15 passes into the container 1. This allows the conveying belt 15 of the conveying means 6 to be in contact with the feed causing even unloading.

Figure 3:
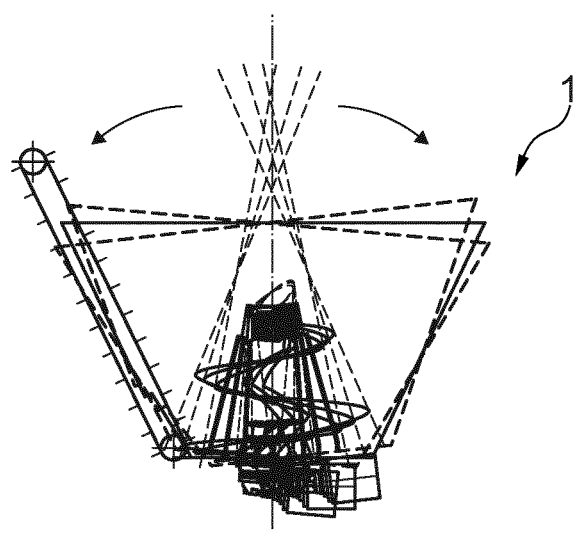
FIG. 3 shows instantaneous images of the feed mixer during a mixing operation, in a side view, FIG. 4 diagrammatically shows a section of the feed mixer according to the invention with a feed mixture.

In the exemplary embodiment which is shown, the container 1 is arranged in such a way that it can be pivoted about a substantially horizontally running pivot axis 4. The container 1 can be pivoted by the pivoting angle V from the starting position (shown in FIG. 1) in the clockwise direction and in the anti-clockwise direction, as is shown by the instantaneous images in FIG. 3. The respective pivoting position of the feed mixer is shown in FIG. 3 using dashed lines. In order to unload the feed mixture, the feed mixer can be pivoted in the anti-clockwise direction by the angle V', that is to say in the direction of the conveying means 6.

Figure 2:
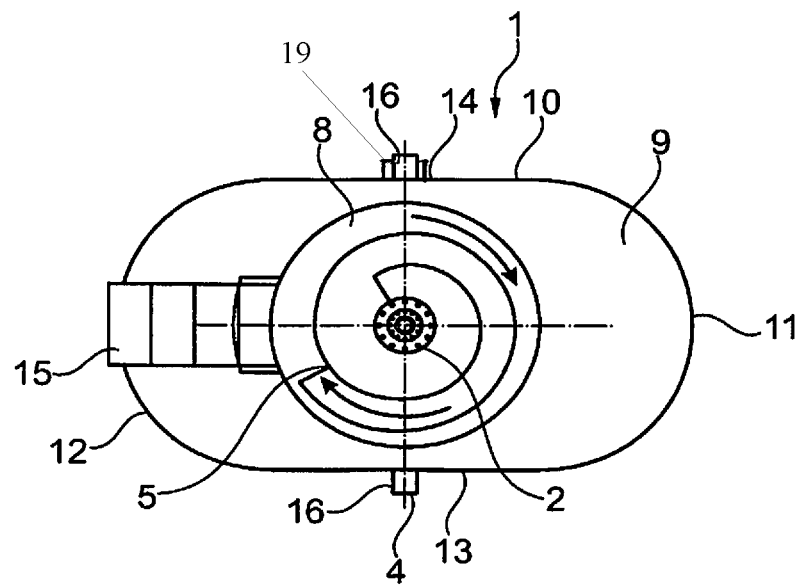
FIG. 2 shows the feed mixer according to FIG. 1 in a plan view.

As shown in FIG. 2, the container 1 has pins 16 which are held pivotably in a support frame 19. The pivot axis 4 is at the same time the axis of the pins 16. In a preferred embodiment the pins 16 and, consequently, the pivot axis 4 can be varied to allow to place the pivot axis 4 in the center of gravity of the filled and/or empty container 1.

A pivoting device (not shown) is provided in order to pivot the container 1. The pivoting device preferably comprises at least one cylinder/piston unit 18, as seen in FIG. 1. The pivoting device can also be realized via control cables or correspondingly arranged camshafts. There is also the possibility to provide a gearwheel on at least one pin, which gearwheel is connected fixedly to the pin so as to rotate with it. The gearwheel can be rotated, for example, via a auger or a toothed rack.

FIG. 3 shows instantaneous images of the feed mixer. Different positions of the container 1 in the pivoted state are shown using dashed lines. As a result of the pivoting operation, the feed which is situated in the container is moved in the direction of the auger 2.

Figure 4:
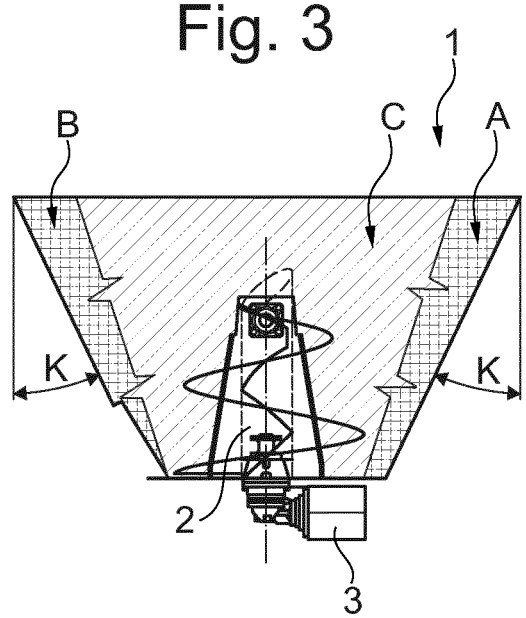
Figure 5:
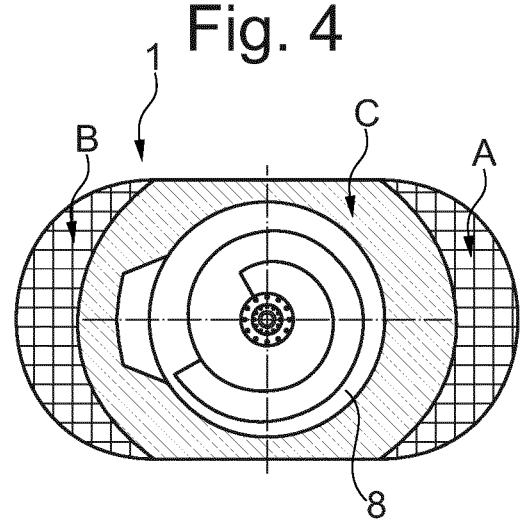
FIG. 5 shows a plan view of the feed mixer according to FIG. 4.

FIGS. 4 and 5 show a container 1, in which feed is situated. As a result of the rotation of the auger 2, the feed is mixed and optionally comminuted.

The region C which is shown using hatched lines represents that region of the feed in which sufficiently satisfactory thorough mixing is achieved. Feed, the thorough mixing or comminution of which is not yet sufficient, is situated in the regions A and B. As a result of the pivoting of the container 1, the feed from the region A and/or from the region B passes into the region C, with the result that improved thorough mixing of the feed can be achieved.

Figure 6:
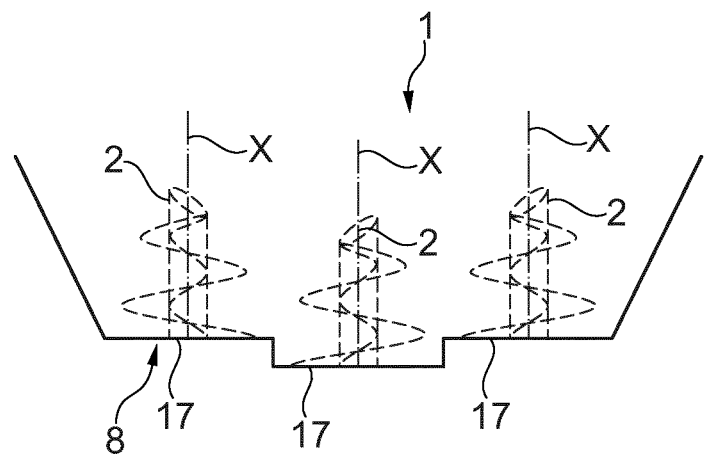
FIGS. 6 to 8: further examples of feed mixers.
Figure 7:
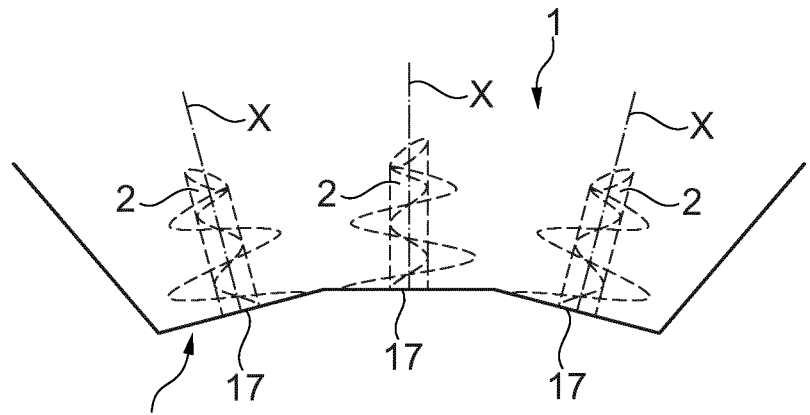
Figure 8:
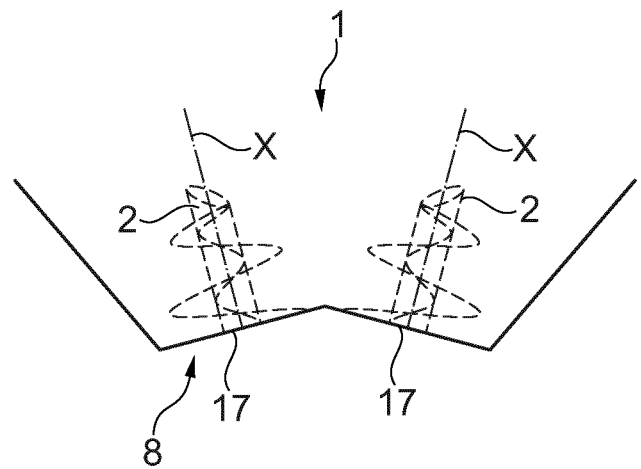

FIGS. 6, 7, and 8 show alternatives of a container 1 with three augers 2 (FIGS. 6 and 7) and with two augers 2 (FIG. 8). Each of the containers 1 has a bottom 8 with several bottom sections 17. Each of the bottom sections 17 is itself planar. FIG. 6 displays an embodiment in which the bottom 8 comprises three bottom sections 17 which are shifted against each other. The container 1 of FIG. 7 comprises three bottom sections 17 which are tilted against one another. The container 1 of FIG. 8 displays two augers 2 each fixed to a bottom section 17 being tilted to the other bottom section 17. All of the augers 2 displayed can be rotated about an axis X being substantially perpendicular to the respective bottom section 17 are substantially perpendicular. Alternatively, the axis X can be slightly tilted towards the bottom 8 or the bottom section 17.

The feed mixer according to the invention and the method according to the invention indicate an efficient and energy-saving possibility of providing a feed mixture. There is also the possibility to provide relatively small feed quantities by means of the feed mixer. An additional mixer for providing relatively small feed mixtures is therefore not required, for example, in dairy farms. The feed mixer according to the invention is suitable, in particular, for providing a feed mixture between 25 kg and 25000 kg or between 0.05 m$^3$ and 100 m$^3$.

The invention claimed is:

1. A method for providing a feed mixture during a mixing operation, the method comprising the steps:
   determining different parameters of the mixing operation via a controller;
   introducing a feed component into a container of a feed mixer, the container having a bottom and a wall which is connected to the bottom and delimits a filling opening, and the area of the filling opening is greater than the area of the bottom;
   activating an auger to be rotated about an axis which runs substantially perpendicularly with respect to the bottom, for carrying out the mixing operation;
   pivoting the container to a first pivot angle determined by said controller during the mixing operation as a function of one or more of said parameters comprising a predefined event, the predefined event being determined as a predefined time period or after a predefined number of revolutions of the auger; and
   pivoting the container to a second pivot angle determined by said controller during the mixing operation.

2. The method claim of claim 1, in which the predefined event is further determined as a function of at least one property of the feed component.

3. The method of claim 1, in which the predefined event is further determined as a function of a weight of the feed component.

4. The method of claim 1, in which the predefined event is further determined as a function of an angle of the auger which tapers conically towards the filling opening.

5. The method of claim 1, in which the predefined event is further determined as a function of a ratio of a height of the container to an axial extent of the auger.

6. The method of claim 1, in which the predefined event is further determined as a function of a wall angle of at least one wall section of the wall which widens substantially conically from the bottom.

7. The method of claim 1, in which the container is pivoted in such a way that an axis of the auger intersects an axis of gravity at the first pivot angle.

8. The method of claim 7, in which the first pivot angle is determined as a function of a property of the feed component.

9. The method of claim 1, in which the first pivot angle for the container is determined as a function of a weight of the feed component.

10. The method of claim 1, in which the first pivot angle for the container is determined as a function of an angle of the auger which tapers conically towards the filling opening.

11. The method of claim 1, in which the first pivot angle for the container is determined by a ratio of the height of the container to the axial extent of the auger.

12. The method of claim 1, in which the first pivot angle for the container is determined as a function of a wall angle of at least one wall section of the wall which widens substantially conically from the bottom.

13. The method of claim 1, in which the step of pivoting the container to the first pivot angle is performed about a substantially horizontal pivot axis.

14. The method of claim 1, wherein the first pivot angle is an unloading angle to unload the feed mixture.

15. The method of claim 14, in which a pivoting direction for unloading the feed mixture corresponds to a pivoting direction during the mixing operation, and the unloading angle is greater than the first pivot angle for the container.

16. A method for providing a feed mixture during a mixing operation, the method comprising the steps:

determining different parameters of the mixing operation via a controller;

introducing a feed component into a container of a feed mixer, the container having a bottom and a wall which is connected to the bottom and delimits a filling opening and the area of the filling opening is greater than the area of the bottom;

activating an auger to be rotated about an axis which runs substantially perpendicularly with respect to the bottom, for carrying out the mixing operation;

pivoting the container to a first pivot angle determined by said controller during the mixing operation as a function of one or more of said parameters comprising a predefined event;

pivoting the container to a second pivot angle determined by said controller during the mixing operation; and introducing a second feed component into the container, and the predefined event being determined as a function of the sequence of the introduction of the first feed component and the introduction of the second feed component.

17. The method of claim 16, in which the second feed component is introduced into the container, after the feed component, and the first pivot angle is determined as a function of a sequence of the introduction of the feed component and the second feed component.

* * * * *